United States Patent [19]
Cohen et al.

[11] 3,763,575
[45] Oct. 9, 1973

[54] PROGRAMMED INFORMATION TRANSMITTAL APPARATUS

[75] Inventors: Ronald S. Cohen; James M. Dawley, both of Milwaukee, Wis.

[73] Assignee: Behavioral Controls, Inc., Milwaukee, Wis.

[22] Filed: June 12, 1972

[21] Appl. No.: 261,919

[52] U.S. Cl..................... 35/9 A, 40/68.4, 40/78.05
[51] Int. Cl. ........................................... G09b 7/04
[58] Field of Search................... 35/9 A, 48 R, 8 R; 40/68.4, 78.05

[56] References Cited
UNITED STATES PATENTS

| | | | |
|---|---|---|---|
| 3,296,727 | 1/1967 | Luguori............................. | 40/68.4 |
| 3,516,176 | 6/1970 | Cleary et al. ....................... | 35/9 A |
| 3,633,289 | 1/1972 | Hannah............................. | 35/48 R |
| 3,579,856 | 5/1971 | Way.................................. | 35/8 R |
| 3,250,021 | 5/1966 | Screven............................. | 35/9 F |

Primary Examiner—Wm. H. Grieb
Attorney—Andrus, Sceales, Starke & Sawall

[57] ABSTRACT

A presentation apparatus includes a annular tray mounted on the top of a projector and retaining a plurality of interrelated program slides. A code band is slipped over the vertical wall of the annular tray with a slight pressure fit as the attachment means. The bandheight generally equals the slide tray wall height and the band is divided into columns, one for each slide. Each column is similarly divided into a plurality of code spots. A reader is mounted in fixed operative relation to the slide projector and includes a separate channel to read each code spot in an aligned column. The reader includes an illuminated plastic block with a fiber optic tube for each channel embedded in the block and terminating adjacent the level of one row of code spots. The band can conveniently be formed of paper or a suitable plastic with each code spot defined by suitable intersecting lines. A pre-cut black pressure sensitive tape is provided for selective application to the code spots.

22 Claims, 6 Drawing Figures

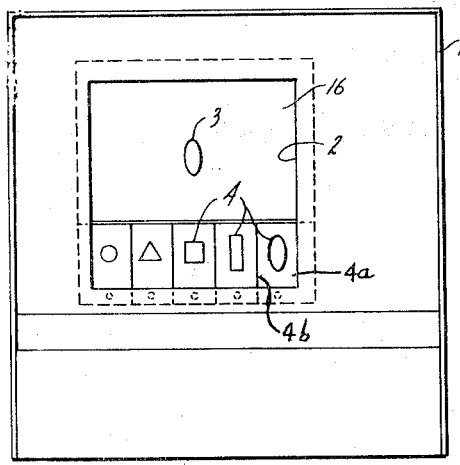
FIG_1
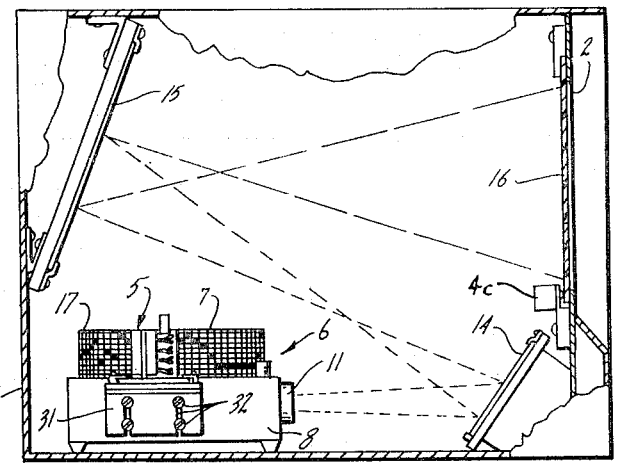
FIG_2
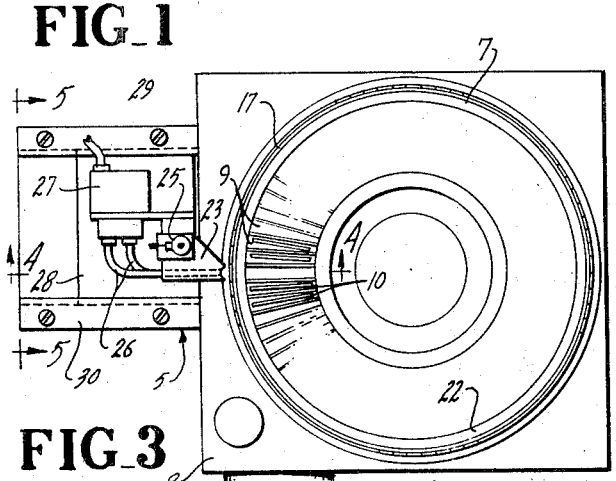
FIG_3
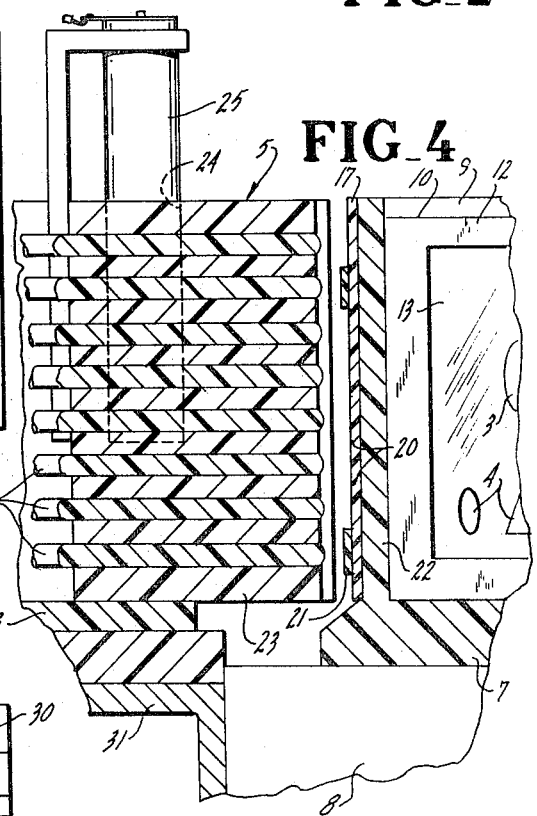
FIG_4
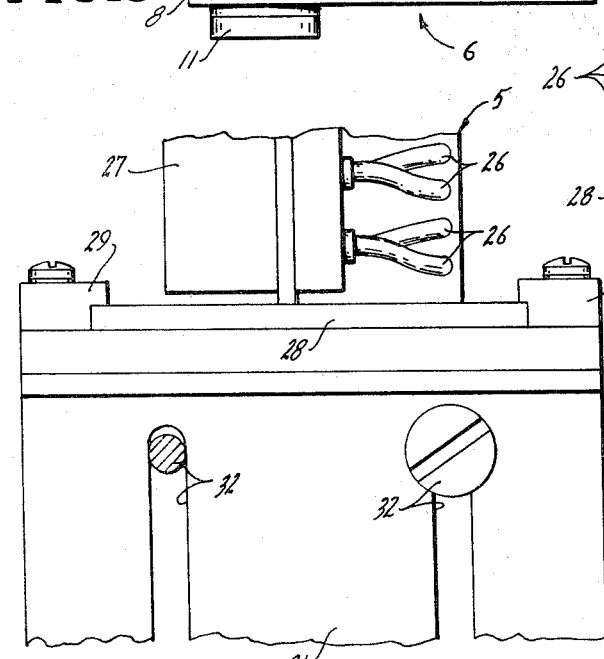
FIG_5
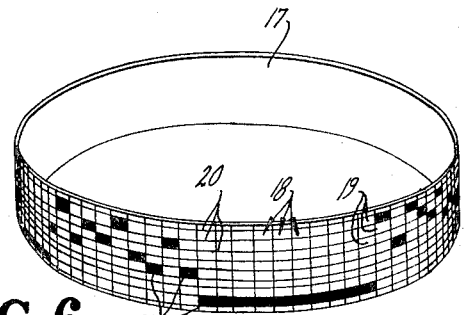
FIG_6

PROGRAMMED INFORMATION TRANSMITTAL APPARATUS

BACKGROUND OF THE INVENTION

This invention relates to a programmed information transmittal apparatus and particularly to a coded visual presentation employing a slide projector apparatus.

In presentation of information, automated display apparatus has been developed for visual and/or interrelated audio presentation of the material. In many applications, interrelated auxiliary equipment is also automatically controlled in accordance with the progress of the presentation. Generally, such apparatus includes a visual presentation apparatus for presenting information to the viewer who may be then required to make some type of a response to the presented subject matter. A coded system is provided to produce an interrelated control of the presentation sequences of the visual material and if desired, interrelated audio and other auxiliary devices in accordance with the responses. A highly satisfactory basic system is shown in U. S. Pat. No. 3,250,021 which issued May 2, 1962. The preferred construction of that machine employs an elongated paper tape which is sequentially moved past a viewing window. The paper tape carries both the primary visual display material such as a question and a plurality of answers, one of which is selected by operation of answer selection button units. Punched holes along a margin of the tape create a coded program which instructs the tape drive to move in a selected manner in accordance with the viewer's response. The programmed system also permits actuation of audio devices and other visual or audio reinforcing devices. Alternative systems have employed film strips with automatic means for transporting the film to the various frames in a predetermined programmed sequence. Such a machine also provides an interrelated coded device for example, an optical code along one edge of the film strip. The paper tape type apparatus had certain very distinct advantages not only from the standpoint of the simplicity of construction but also very significant advantages from simplicity of use. For example, an instructor, employing the apparatus as a part of teaching programs, could, by the use of such simple and readily available instruments such as the typewriter, rubber stamp, felt tip pens and normal writing material, readily construct programs for the apparatus as well as directly change existing programs. This eliminated the necessity of relying on preformed programs such as are generally required in connection with the slide and film strip devices which are presently available.

Thus, the paper presentation system, particularly because of the reproductability and the direct programming by the instructor, had very distinct advantages during the initial development of automatic programmed teaching apparatus. However, the current developments in the various areas of programmed information transmittal have significantly expanded the program forming instruments available to the user and in particular, the prior severe constraints on the use of film devices particularly the formation and reproduction of programs do not exist. Thus most schools, research organizations and the like will have instructional media laboratories including facilities for assistance in the development of audio-visual film presentations. Generally, such facilities permit ready construction of slides, film strips, overhead transparencies, and in larger installations, movies. Further, if they are not directly accessible, they are readily available through outside service organizations. Modern technology therefore readily permits adaptation and employment of film devices from the standpoint of construction and presentation of programmed material. However, all of these devices employ coding methods which generally require special apparatus which is in turn not readily available. Thus a very conventional system provides the code directly on the film and adjacent the viewing portion. The code is generally required to be placed on when the picture is taken or through other special means. The user can therefore reproduce a given programmed film means but it becomes somewhat difficult to generate their own program and changing of an existing program can be extremely time consuming and costly. Further, where the code is integrally formed with the slide or film frame, each bit or frame is generally tied to that particular program as such and cannot, without complicated and time consuming revision, be readily inserted into a significantly different program system. Further, where the program is formed as a part of a film strip or frame, projected registration becomes very important to insure proper presentation and coding. Generally, each presentation machine is constructed to accept a particular coded film unit.

One method which has been suggested to avoid such a system is the use of a slide projector with each slide separately coded by punching of holes or the like in the slide frame. This can be adapted to cardboard and perhaps certain plastic slides but is quite difficult for metal and glass jacketed slides. Further, the coding does require a special instrument, is relatively slow and the system has not been considered to be highly economical or practical. Another disadvantage of this and other related systems employing a code on the slide results from the necessity of mounting a reader inside of the projector and particularly adjacent to the edge area of the slide frame. A similar system has been suggested for a film strip by providing of a special plastic edge holder for the film strip. Such a system is, however, only adapted to very large production quantities and is not practically adapted to individual and direct formation of a program control.

Other systems have been also suggested employing a fixed sequence wherein a special mechanical actuating clip system is provided attached to the machines to set up the code directly by the location of the control devices on the apparatus. They are relatively limited in their control functions, such as determining when a correct answer is given and are further quite limited in the amount of material which can be incorporated within any one given program unit. Other systems have suggested the use of a synchronized magnetic or similar coded tape unit. Various tones or other signals on the tape generate control signals which, through electronic circuitry and the like, can provide the necessary encoding and decoding to maintain synchronous programmed operations. Such systems require relatively careful design of the interrelated drive controls which may also result in a relatively expensive system. Other external programmers have also been suggested such as punched paper tape readers, card readers and the like. These systems however also present difficulty in establishing and maintaining reliable synchronization.

Various other systems have been suggested in connection with various rotating devices with interrelated control systems. Thus, for example, annular type slide trays have been provided with suitable microswitches mounted adjacent to the unit and with the annular tray unit provided with suitable cam devices for mechanically actuating the switches. This requires direct changing of the annular tray unit and application of special camming devices is relatively time consuming and tedious. Further, reproducing such a system is, of course, very difficult or requires relatively expensive apparatus to form the necessary cam mold. Such mechanical scanning devices also have the usual disadvantages associated with wear and loading of the tray system.

As a result, although the film type machines have many advantages particularly from the standpoint of ease and economy of mass production of the programs, the interrelated coding systems have limited the development and practical application of such systems.

SUMMARY OF PRESENT INVENTION

The present invention is particularly directed to a presentation apparatus and system for sequentially presenting a plurality of information slides in a programmed manner with a relatively simple and highly reliable program coding means. Generally, the present invention employs a slide support mens such as a tray of the usual standard and well-known construction having a plurality of separate individual slide pockets or holders interconnected to each other for supporting a series of slides in a predetermined face to face array. A multiple channel code strip is provided with individual slide code areas disposed in a corresponding array. A code reader is provided for selectively reading each of the multiple channel code areas, and thus providing a coding means. The reader and code strip are mounted such that the one is attached to and moves with the slide support means and thus provides a corresponding interrelated scanning of the code strip.

In an unusually satisfactory construction of the present invention, the code strip is an elongated rectangular strip having a height generally corresponding to the height of the slide tray such that the code strip can be applied directly to the side wall of the tray. A reader is mounted in fixed operative relation to the slide projector to read each code column and provide an interrelated output for the slide being presented. The coding and optical system provide a very simple, reliable and inexpensive system which is particularly adapted to production by the user. Thus the code strip can conveniently be formed of paper or a suitable plastic with the code area defined by suitable intersecting lines. To code the system, it is merely necessary to apply pre-cut black pressure sensitive tape to the code strip. A plurality of code strips may be readily reproduced by a silk-screen process or the like. The code strip can be directly applied to the side of the slide tray to provide accurate synchronous movement therebetween. In annular tray units, a code strip may be slipped over the vertical wall of the tray with a slight pressure fit as the attachment means. The interconnection of the code strip to the tray insures a high degree of accuracy of movement for coded members relative to the slide tray as the latter is advanced in either direction to a presentation position. The multiple code channels provide the necessary information for controlling of the slide projector and/or the necessary auxiliary equipment in accordance with the general systems heretofore suggested.

The present invention has been found to provide a relatively simple and reliable programmed information transmittal apparatus which maintains the desired flexibility to permit construction of a program directly by the user while avoiding many of the previously mentioned objections associated with the film type presentation devices and systems heretofore available for such programmed systems.

DESCRIPTION OF ILLUSTRATED EMBODIMENT OF THE INVENTION

The drawing furnished herewith illustrates a preferred construction of the present invention in which the above advantages and features are clearly disclosed as well as others which will be readily understood from the following description.

In the drawing:

FIG. 1 is a front elevational view of programmed information presentation apparatus employing a slide projector constructed in accordance with the present invention;

FIG. 2 is a side elevational view of FIG. 1 with a portion of the housing removed to show the inner details of construction;

FIG. 3 is a top view of the slide projector shown in FIG. 2;

FIG. 4 is a sectional view taken on line 4—4 of FIG. 3 and showing a code reader attached to the slide projector assembly;

FIG. 5 is a fragmentary enlarged view of the code reader taken generally on line 5—5 of FIG. 3; and FIG. 6 is a pictorial view of a coding band shown in FIGS. 2-4.

DESCRIPTION OF ILLUSTRATED EMBODIMENT

Referring to the drawing and particularly to FIGS. 1 and 2, a visual presentation apparatus is shown including an outer housing 1 having a front presentation opening or area 2 within which a question or other stimulus information is presented which may require some response by the viewer. In the illustrated embodiment of the invention, a multiple choice presentation system is given and in particular a geometric configuration 3 is presented with a series of interrelated response configurations 4, one of which is correct. The response configurations 4 are located in an answer selection area which can be touched by the viewer to select an answer. Thus, the lower portion of the wall is slitted to define an actuator 4a for each response configuration, integrally and pivotally joined with the wall as at 4b for operation of the response selection means 4c by pushing on the corresponding actuator. The selection is automatically interrelated through a code reading means 5 to detect correct and incorrect responses and to actuate the apparatus to present further information in accordance with the responses. The presentation of the information and interrelated control is provided through a slide projector means 6 having an integrated code reading means 5 which is particularly constructed in accordance with the teaching of the present invention.

The illustrated slide projector means 6 is shown as a annular tray type which can be readily purchased on the commercial retail market or the like. Generally, the slide projector means 6 includes a annular slide support or tray 7 releasably mounted on the upper wall of a projector 8.

The projector means may for example be a conventional annular tray type slide projector 8 such as that sold by Eastman-Kodak Company under the trademark Ektagraphic slide projector. The annular slide tray 7 is releasably mounted on the projector 8 and includes a plurality of individual small radial pockets 9 within each of which an individual slide 10 is disposed. The slide tray 7 is rotatably mounted for selective alignment with a viewing location or slot in the projector 8 immediately beneath the tray. The slide 10 is moved from the tray into the projector 8 for transmission of the information on the respective slide through a lens 11. The apparatus automatically drops and raises the aligned slide 10 between the viewing and storage positions with any of the well-known mechanisms employed in the commercial slide projectors, and no further description thereof is given.

As shown in FIG. 4, slides 10 are the conventional transparencies which include an encircling cardboard jacket or frame 12 within which the transparent film 13 is supported to provide a relatively rigid unit. The slide film 13 carries the images of the stimulus information 3 and responses 4. This unit rests in the respective pockets 9 with a relatively free movement. It is accurately aligned however with the projector presentation slot when the tray 7 is rotated for transfer of the slide into and from the viewing slot.

The projector 8 is mounted on the bottom wall within the back or rearward portion of the housing 1. In order to reduce the length of the housing 1, the image is projected to the viewing area 2 through a pair of angularly related mirrors 14 and 15. Thus, the first mirror 14 is mounted adjacent to the forward portion of the housing 1 in alignment with the projector lens 11 and is angularly related to reflect the image upwardly and rearwardly. The second mirror 15 is mounted to the rearward portion of the housing 1 and transmits the image onto a viewing screen 16 overlying the viewing area.

This permits use of the slide projector 6 in a reasonably sized housing 1 with accurate projection of the conventional film slides 10 and particularly 126 type slides.

In accordance with the present invention, the coding strip 17 is integrated into the slide support means 7 without the necessity of reconstruction of the projector while maintaining highly accurate synchronous drive of the projector and the code means. Generally, a coding strip 17 is interconnected to a normal exterior surface of the slide tray 7 and an optical code reader 5 is secured adjacent to the periphery of such surface to provide automatic reading of the coded strip.

More particularly, the strip 17 is a coding band which encircles the slide tray 7 and in the illustrated embodiment is of the same height, although it may be made higher or lower. The coding band is divided into a plurality of code columns 18, one for each of the slide pockets 9. They can be conveniently similarly aligned such that the coding for any given slide 10 is directly related to the position of that slide being visually presented. Each code column 18 is divided into a plurality of corresponding similar axially spaced code positions 19. Thus, in the illustrated embodiment of the invention, each code column is divided into eight separate code positions by a plurality of circumferential parallel lines 20.

The illustrated coding band 17 is further formed with a suitable outer white surface and the surface is color-coded by selective application of dark and preferably a black cover 21 on selected code positions 19, as most clearly shown in FIG. 6. In a very convenient system, the blank coding band 17 can be formed of a suitable white vinyl plastic. The code positions in each column are selectively coded by applying, in the appropriate location, an appropriate black cover from a pre-cut pressure sensitive black tape 21. Such a system allows the user to readily construct his own coding band 17 to be applied to the standard tray structure 7. Further it provides a very convenient master band which can be readily duplicated by silk-screening or the like.

The band or annular shape can be formed from a flat elongated strip of the vinyl material with a suitable adhesive connecting the ends together to form the annular band. The diameter is selected to permit the band to telescope directly downwardly over the vertical wall 22 of the tray with a reasonably tight fit. The several code area or columns 18 can be readily manually aligned with respect to reader 5 and with the corresponding slide 10 to provide accurate location and relationship between the code and a particular slide. Although the system may provide for any position on the tray by appropriate location of the reader, the direct alignment is preferred. The band can then be bonded to the rotating tray 7 either through a suitable adhesive, a releasable attachment clip or the like. Generally, applicant has found that the special attachment is not necessary by employing a reasonably tight slip fit. The latter is desirable where the band will be changed. The coding band 17 is, however, mounted in a fixed relation to the tray and maintains accurate synchronization of the positioning of the slides for viewing and the alignment of the code with the code reader.

Each of the separate code positions 19 produces a binary signal which may be related to a particular control circuit function; for example, a correct answer selection. If desired, the several positions can be interrelated to define binary number code systems.

The illustrated code reader means 5 is a photocell type reading unit adapted to individually read each of the code positions 19 in an aligned code column 18. The illustrated code reader 5 in particular includes a plastic or glass block 23 having a recess 24 with a lamp 25 embedded therein. Energization of the lamp 25 results in transmission of the light through the block 23 to a narrow reading surface which is preferably concavely curved to direct or focus the light on an aligned column 18 and is closely spaced, shown exaggerated in the drawings, from the periphery of the tray 7 and in particular the outer surface of the coding band. Eight fiber optic channels 26 are embedded within the block, with their ends spaced in accordance with the spacing of code positions 19 such that each is aligned with a related code position of an aligned code column 18, the illuminated aligned column 18 with the corresponding end of the fiber optic channel 26 detecting the level of light reflection from either a black or a white spot. This, in turn, produces an on-off or binary type logic in each channel. The light signal is transmitted via the channel 26 to a bank 27 of photocells or the like to transduce the signal and form a connector into any suitable control circuit for controlling the operation of the projector, suitable response means, audio reinforcing means and the like. As the photocells are spaced from and not directly activated from the code areas or points, they can be relatively large, inexpensive devices. The fiber optics permit convenient close spacing at the reading end to accommodate the several code positions.

The code reader 5 is preferably releasably mounted adjacent to the tray 7 to permit retraction for convenient removal of the slide tray 7. In the illustrated embodiment of the invention, the code reader 5 is secured on a slide plate 28 which is slidably mounted within a pair of laterally spaced tracks 29 and 30. The plate 28 is preferably formed of a slightly flexible plastic and is tightly fitted within the slide tracks. In the mounted position, the relatively firm frictional engagement with the slide tracks 29 and 30 firmly supports the code reader 5 in position. It can be readily removed however through a manually applied hand force by pulling outwardly on the slide. Further, if removed completely, the plate 28 can be reintroduced into the slide tracks by deflecting of the plate slightly. The tracks 29 and 30 are secured to the side of projector 8 by an L-shaped bracket 31. A bolt and slot connection 32 to the side of the projector 8 permits accurate alignment of the channels 26 and band 17.

Alternatively, the slide support can be pivotally attached to the projector for pivotal movement about a horizontal axis such that it can be pivoted outwardly and away from the slide tray. This may be desirable as the slide tray itself may be removed by a pivoted movement and cause a simultaneous pivoting of the reader.

The housing 1 is preferably made sufficiently large to accommodate the electronic signal processing and control equipment as well as suitable audio equipment such as tape units, cassette units and any other reinforcing or auxiliary equipment normally employed with programmed presentation. As such construction will be readily available to those skilled in the art, no detailed description thereof is given.

Thus the present invention provides a very simple, reliable and inexpensive coded program control. In an actual teaching machine such as shown, the multiple choice selection means would provide inputs compared with coded input to control the projector as well as auxiliary equipment such as cassette recorders, electronic counters, and associated reinforcing materials whether audio, visual or the like. As in other teaching machines, the coded systems provide machine instructions such as to advance in accordance with the response such as only on correct answers and to then branch forward or backward to a selected film slide depending upon the particular response. In addition, the device can readily be applied to general public access machines for amusement, general information transmittal and retrieval and the like.

The output can, of course, be connected in any desired system. Program experimenters may use the several output terminals connected to a four pole, double throw relay for pulsed operation in accordance with the transduced output. The output terminals of the relay may be brought out to a patch board on which the researcher could interconnect the terminals for different output functions as a result of the optical coding. This would be desirable to establish interfacing with other logic circuits and thereby permit variations of timing, scoring, data recording, reinforcing as well as synchronization with other stimuli such as light, shock, sound, and the like.

The coding system may be applied to most of the conventional slide projectors. Within the broadest aspects of the present invention, the code strip may be mounted as a stationary member with a code reader affixed to the movable slide tray to move therewith. The reader would thus be moved into alignment with a particular code area or column in synchronism with the movement of the related slide to a presentation position as in the illustrated embodiment. Generally, the movement of the code reader would result in the necessity of providing some means of transmitting the signal through the movable system with the use of a commutation means, elongated leads or the like. Such system would therefore have certain disadvantages from a practical standpoint but would retain the advantage of the improved coding strip and accurate synchronism of the code means without the necessity of complicated constructions. Thus, the reader could be readily mounted to the tray without the necessity of reconstruction and the code strip could be provided with a separate mounting means for attachment directly to the commercially available slide projectors. The reading system may employ other energy field reading systems. For example, a magnetic tape or strip may be employed with an appropriate multiple channel reader for reading of the several code areas.

The present invention thus provides a film type programmed presentation apparatus with a novel coding means retaining a high degree of simplicity which permits use of existing code programs as well as formation of the code element by the user in a practical and inexpensive procedure. The apparatus includes the versatility of present film type devices without the difficulties and objections which have been raised in the practical application of such devices.

Various modes of carrying out the invention are contemplated as being within the scope of the following claims, particularly pointing out and distinctly claiming the subject matter which is regarded as the invention.

We claim:

1. A programmed information presentation apparatus comprising a slide projector including a movable slide cartridge for retaining a plurality of individual slides in a predetermined array stacked face to face for presentation, a coding strip with a plurality of coded areas arranged in accordance with the array of said slides and each code area including coded information selected from a plurality of different pieces of predetermined coded information related to a slide, a code reader for selectively reading of each code area and producing an output uniquely related to the coded information and distinguishing from the other available coded information, and mounting means coupling one of said strips and reader to said cartridge for synchronous movement with the cartridge and fixedly mounting the other of said code strip and reader adjacent said cartridge.

2. The programmed information presentation apparatus of claim 1 including said code reader mounted to the slide projector with a reading means located in alignment with the slide cartridge, said coding strip being releasably attached to a side of said cartridge with the plurality of coded areas arranged parallel to the edge of a slide and including a plurality of code points, and said reading means being aligned with a total code area of said strip for each position of said cartridge to read all of said plurality of code points.

3. The programmed information presentation of claim 2 wherein said code reader includes a light source for illumination of the coding strip, and light responsive means aligned and arranged in accordance with said plurality of code points and responsive to the reflected light for producing said output uniquely related to the coded information on the corresponding code points.

4. The programmed information presentation apparatus of claim 1 wherein said code strip is optically coded at each code point with a plurality of code points, and said code reader includes a plurality of fiber optic channels arrayed in accordance with the code points in each code area for establishing a corresponding number of related signals.

5. The programmed information apparatus of claim 4 including a plurality of photocell elements connected one each to the outer ends of each fiber optic channel.

6. The programmed information presentation apparatus of claim 4 wherein said code reader includes a light transmitting mounting block, said block being mounted adjacent the sidewall of the tray and having a spaced lamp supporting portion terminating in a rectangular concavely surfaced illuminating edge generally corresponding to a code column and located immediately adjacent the sidewal of the tray.

7. A programmed information presentation apparatus, comprising a slide projector including a movable slide tray for retaining a plurality of individual slides in parallel face to face relationship and in a predetermined array for movement with said cartridge for selective presentation, said tray having an exposed side, a coding strip attached to an exposed side of said tray with a plurality of coded areas arranged in accordance with the array of said slides, and each code area including coded information selected from a plurality of different pieces of predetermined coded information related to a slide, and a code reader means mounted adjacent said cartridge for reading of a code area corresponding to the slide in position for presentation and producing an output uniquely related to the coded information and distinguishing from the other related coded information.

8. The programmed information apparatus of claim 7 wherein said coding strip includes a series of adjacent generally rectangular code areas, one for each presentation slide location in said tray and corresponding to the edge of the slide location, each code area including a similar plurality of code points.

9. The programmed information apparatus of claim 8 wherein said strip is attached to the tray with the code areas aligned with said slide locations to insure accurate synchronous movement.

10. The programmed information presentation apparatus of claim 7 wherein slide tray is an open-top unit having a plurality of similar adjacent slide pockets, one for each slide, said slides being automatically removed and returned for selective projection, said coding strip conforms to the exposed exterior side wall of the tray and includes a series of adjacent generally rectangular code columns, one for each presentation slide pocket in said tray and generally corresponding to the edge configuration of the slide pocket, each code area including a similar plurality of aligned code points, and means to attach said strip to the side of the tray with each code area accurately aligned with one of said slide pockets.

11. The programmed information presentation apparatus of claim 10 wherein said coding strip is constructed of a base having an opaque outer surface of a first optical coding medium, a plurality of second optical coding overlay elements each corresponding in size to a code point for adhesive attachment, and said code reader is an optical reader means located to simultaneously read the plurality of code points of a code area in accordance with the movement of said tray.

12. The programmed information apparatus of claim 7 wherein said slide tray is a annular unit rotatably mounted to the exterior of the projector and having generally radial pockets, said coding strip being an annular band and including a series of adjacent generally rectangular code columns defining said code area, a separate code column being provided for each slide pocket in said tray and generally corresponding to the edge of the slide pocket, each code column including a similar plurality of rectangular code points, and said annular code strip being slidably mounted about the tray wall with each code column aligned with a slide pocket.

13. The programmed information presentation apparatus of claim 12 wherein said annular coding strip is constructed of a white vinyl plastic base with each code point defined by the interstices of intersecting point defining lines, and a tape supporting a plurality of black elements corresponding in size to a code point and having an adhesive thereon for attachment to said plastic base, said reader means being a photosensitive means located to read said code areas in accordance with the movement of said tray.

14. The programmed information presentation apparatus of claim 7 wherein said coding strip is constructed with each code area including a plurality of optically coded points, and said code reader is a photocell reader means located to read said code points of each area in accordance with the positioning of said tray in said projector.

15. The programmed information presentation apparatus of claim 14 wherein said code strip is of an opaque constant color on the exterior surface, to receive an opaque cover of a distinctly different color from said exterior surface to define a binary logic optical code.

16. The programmed information presentation apparatus of claim 7 including an enclosing housing having a front viewing area and a plurality of response selection means, said projector being mounted within the housing in tray spaced relation to said viewing area, and a first reflector means mounted in the forward part of the housing in alignment with the projector lens and projecting the image upwardly pocket rearwardly, a second reflector means mounted in the rearward part of the housing to receive the image disposed the first reflector means and reprojecting the image onto the front viewing area.

17. The programmed information presentation apparatus of claim 16 wherein said viewing area includes a plastic forward wall, the lower portion of said wall being slitted to define an actuator integrally and pivotally joined with the wall for operation of the response selection means by pushing on the corresponding actuator.

18. The programmed information presentation apparatus of claim 7 wherein said slide tray is an annular member having a plurality of adjacent radial slide pockets for individually supporting said slides, and said tra being rotatably mounted upon the top of the slide projector with a vertical annular sidewall generally corresponding to the height of the slide, and having a lower outwardly extending poceet identifying ridge, said coding strip being an annular member generally corresponding to said exposed side and slidably dispodd in engagement with and over said sidewall, said code areas being adjacent rectangular axial columns each of a width corresponding to the width of the slide pocket and said strip being divided into a plurality of rows to establish a corresponding number of code points in each column, and said code reader being mounted adjacent the sidewall and including a plurality of reading channels spaced axially along said sidewall for separately reading each code point in an aligned code column.

19. The programmed information and presentation apparatus of claim 18 wherein said code reader includes a plurality of fiber optic channels arrayed in accordance with the code points in each code area for establishing a corresponding number of related signals, a light transmitting mounting block, said block being mounted adjacent the sidewall of the tray and having a spaced lamp supporting portion terminating in a concavely surfaced illuminating edge generally corresponding to a code column and located immediately adjacent the sidewall of the tray.

20. A programmed information presentation apparatus employing a slide projector including a movable slide cartridge for retaining a plurality of individual rectangular film slides in face to face closely spaced relation and in a predetermined array for presentation, the improvement in a code control input means comprising an elongated coding strip having means for attachment to said cartridge, said strip including a plurality of coded areas arranged in accordance with the array of said slides in said cartridge and said attachment means providing synchronous movement of the cartridge and strip, each of said coded areas including a similar plurality of adjacent code points for establishing multiple bit coded information at each code area.

21. The programmed information apparatus of claim 20 wherein said coding strip includes a series of adjacent generally rectangular code areas, one for each presentation slide location in said cartridge and corresponding to the edge of the slide location, each code area including a plurality of similar optically coded points, and means to attach said strip to the cartridge with the code areas aligned with said slide locations to define a carrier means and accurately insure said synchronous movement.

22. A programmed information presentation apparatus including a multiple slide tray for a plurality of individual slides and an optical code carrier in a plurality of code areas each comprising a plurality of code points, comprising a code reader including a plurality of light transmitting channels arrayed in accordance with the code points in each code area for establishing a corresponding number of related signals, a light transmitting mounting block with said channels mounted therein, said block being mounted adjacent the code carrier and having a spaced lamp supporting portion terminating in an illuminating edge generally corresponding to a code area and located immediately adjacent the sidewall of the tray, and a light responsive means connected to the outer end of the light transmitting channels.

* * * * *

UNITED STATES PATENT OFFICE
CERTIFICATE OF CORRECTION

Patent No. 3,763,575            Dated October 9, 1973

Inventor(s) RONALD S. COHEN and JAMES M. DAWLEY

It is certified that error appears in the above-identified patent and that said Letters Patent are hereby corrected as shown below:

| | | | |
|---|---|---|---|
| Column 3, | Line 26, | after "support" delete "mens" and insert --- means ---; |
| Column 8, Claim 1 | Line 52, | after "said" delete "strips" and insert --- strip ---; |
| Column 8, Claim 2 | Line 62, | before "including" insert --- each of said code areas ---; |
| Column 9, Claim 7 | Line 29 | after "said" cancel "cartridge" and insert --- tray ---; |
| Column 9, Claim 7 | Line 37 | after "said" cancel "cartridge" and insert --- tray ---; |
| Column 10, Claim 16 | Line 48, | before "spaced" cancel "tray" and insert --- rearwardly ---; |
| Column 10, Claim 16 | Line 51, | after "upwardly" cancel "pocket" and insert --- and ---; |
| Column 10, Claim 16 | Line 53, | after "image" cancel "disposed" and insert --- of ---; |
| Column 10, Claim 18 | Line 67, | before "being" cancel "tra" and insert --- tray ---; |
| Column 11, Claim 18 | Line 3, | after "extending" cancel "poceet" and insert --- pocket ---; |
| Column 11, Claim 18 | Line 6, | at the beginning of the line cancel "podd" and insert --- posed ---. |

Signed and sealed this 16th day of July 1974.

(SEAL)
Attest:

McCOY M. GIBSON, JR.
Attesting Officer

C. MARSHALL DANN
Commissioner of Patents